United States Patent
Lin

(10) Patent No.: US 8,163,174 B2
(45) Date of Patent: Apr. 24, 2012

(54) SUBMERGED BIOFILTRATION PURIFYING APPARATUS

(76) Inventor: Jun-Nan Lin, Banciao (TW)

(*) Notice: Subject to any disclaimer, the term of this patent is extended or adjusted under 35 U.S.C. 154(b) by 277 days.

(21) Appl. No.: 12/695,369

(22) Filed: Jan. 28, 2010

(65) Prior Publication Data

US 2011/0180467 A1    Jul. 28, 2011

(51) Int. Cl.
*C02F 3/06* (2006.01)
(52) U.S. Cl. ..... 210/151; 210/194; 210/197; 210/242.1; 210/242.2; 210/615
(58) Field of Classification Search ............. 210/150, 210/151, 170.05, 170.06, 194, 195.3, 197, 210/202, 220, 242.1, 242.2, 615
See application file for complete search history.

(56) References Cited

U.S. PATENT DOCUMENTS

| | | | | |
|---|---|---|---|---|
| 3,235,234 A | * | 2/1966 | Beaudoin | 210/242.2 |
| 4,422,930 A | * | 12/1983 | Hatanaka | 210/150 |
| 5,156,742 A | * | 10/1992 | Struewing | 210/151 |
| 5,202,027 A | * | 4/1993 | Stuth | 210/151 |
| 5,344,557 A | * | 9/1994 | Scanzillo | 210/242.1 |
| 5,389,247 A | * | 2/1995 | Woodside | 210/151 |
| 5,500,112 A | * | 3/1996 | McDonald | 210/151 |
| 5,507,950 A | * | 4/1996 | Senda et al. | 210/150 |
| 6,348,147 B1 | * | 2/2002 | Long | 210/150 |
| 6,554,996 B1 | * | 4/2003 | Rebori | 210/151 |
| 6,821,423 B2 | * | 11/2004 | Cattaneo-Vietti et al. | 210/150 |
| 6,942,788 B1 | * | 9/2005 | Cox et al. | 210/151 |
| 2005/0269262 A1 | * | 12/2005 | McBride | 210/242.2 |

* cited by examiner

*Primary Examiner* — Christopher Upton
(74) *Attorney, Agent, or Firm* — Daniel Schein, Esq.

(57) ABSTRACT

A submerged biofiltration purifying apparatus includes a settling zone being a 3D space having open top, bottom, and two lateral sides; one or more filtering zones coupled to the two lateral sides of the settling zone, and each being a 3D space with open sides and having soft contact media connected thereto; and one or more bubble aeration units connected to bottoms of the filtering zones. The soft contact media allow biological films to grow thereon. The bubble aeration units generate air bubbles that guide sewage to flow toward the soft contact media, so that organic substances in the sewage are adsorbed to the biological films. The soft contact media are arranged at a specific angle for the sewage to naturally diffuse toward two lateral sides of the settling zone and recycle. And, purified water settles in the settling zone again to remove remaining suspended solids to achieve sewage purification.

10 Claims, 4 Drawing Sheets

SUBMERGED BIOFILTRATION PURIFYING APPARATUS

FIELD OF THE INVENTION

The present invention relates to a submerged biofiltration purifying apparatus, and more particularly to a submerged biofiltration purifying apparatus that is submerged below a water surface, includes soft contact media arranged at a specific angle, and has a settling zone.

BACKGROUND OF THE INVENTION

The biological contact stabilization process has been applied in sewage treatment for many years. However, the conventional terrestrial biological contact stabilization process is disadvantageous in that it fails to endure low temperature, tends to cause drying and accordingly death of biological films when the supply of water stops, and tends to produce bad odor and result in the propagation of flies and mosquitoes when the aeration is insufficient. Therefore, the submerged biological contact stabilization process has been developed and widely applied in sewage and wastewater treatment.

On the other hand, the conventional biological aerated lagoon has also been applied in the sewage treatment for more than one hundred years. In the past years, improvements made to the biological aerated lagoon lie mainly in the aerator used therewith and the mixing of water without other significant breakthrough. Since the biological aerated lagoon does not provide the function of sludge recycling, the mix liquor suspended solid (MLSS) concentration in the biological aerated lagoon is at best about 500 mg/l. Thus, the conventional biological aerated lagoon requires a very large area because a holding time as long as 10 to 30 days is required. Further, the MLSS in the biological aerated lagoon is subject to poor settling due to changes in water temperature in different seasons, which would result in excessive suspended solids in the discharged water and accordingly, poor sewage treatment effect.

Therefore, it is desirable to develop an improved submerged biofiltration purifying apparatus, so that sewage treatment can be performed in a simple way at reduced electric power consumption to provide stable filtering effect, upgraded pollutant removal efficiency, and high flexibility in operation.

SUMMARY OF THE INVENTION

A primary object of the present invention is to provide a submerged biofiltration purifying apparatus, a structural design thereof provides a settling zone, one or more filtering zones and one or more bubble aeration units, allowing the submerged biofiltration purifying apparatus to submerge in a biological aerated lagoon for use, so that sewage treatment can be performed in a simple way at reduced electric power consumption to provide stable filtering effect, upgraded pollutant removal efficiency, and high flexibility in operation.

To achieve the above and other objects, the submerged biofiltration purifying apparatus according to the present invention includes a settling zone being a 3D space with a top, a bottom, and two lateral sides thereof in an open state; one or more filtering zones being separately coupled to the two lateral sides of the settling zone, and each being a 3D space with all sides thereof in a completely open state, and having a plurality of soft contact media provided therein and connected thereto; and one or more bubble aeration units being connected to bottoms of the filtering zones.

In the submerged biofiltration purifying apparatus according to the present invention, the soft contact media allow biological films to stably grow thereon. The bubble aeration units generate air bubbles that guide sewage to flow toward the soft contact media, so that organic substances in the sewage are adsorbed to the biological films. The soft contact media are arranged at a specific oblique angle to allow the sewage to naturally diffuse toward the two lateral sides of the settling zone and to recycle, so that purified water settles in the settling zone again to remove any remaining suspended solids and achieve the function of sewage purification. The fully purified water is then discharged from the settling zone. With the above arrangements, the submerged biofiltration purifying apparatus of the present invention enables the sewage treatment to be performed in a simple way at reduced electric power consumption to provide stable filtering effect, upgraded pollutant removal efficiency, and high flexibility in operation.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
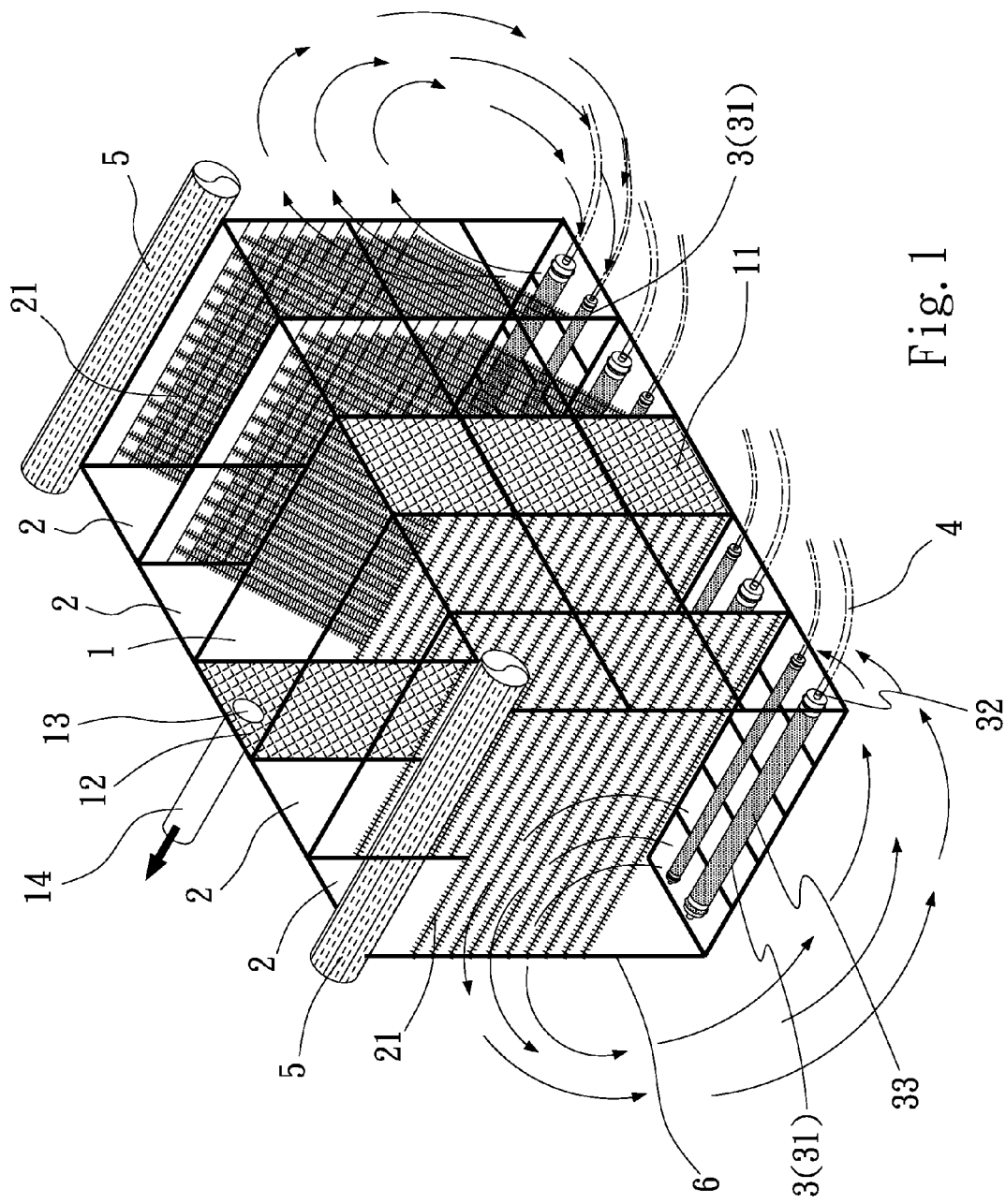
FIG. 1 is an assembled perspective view of a submerged biofiltration purifying apparatus according to a preferred embodiment of the present invention.
Figure 3:
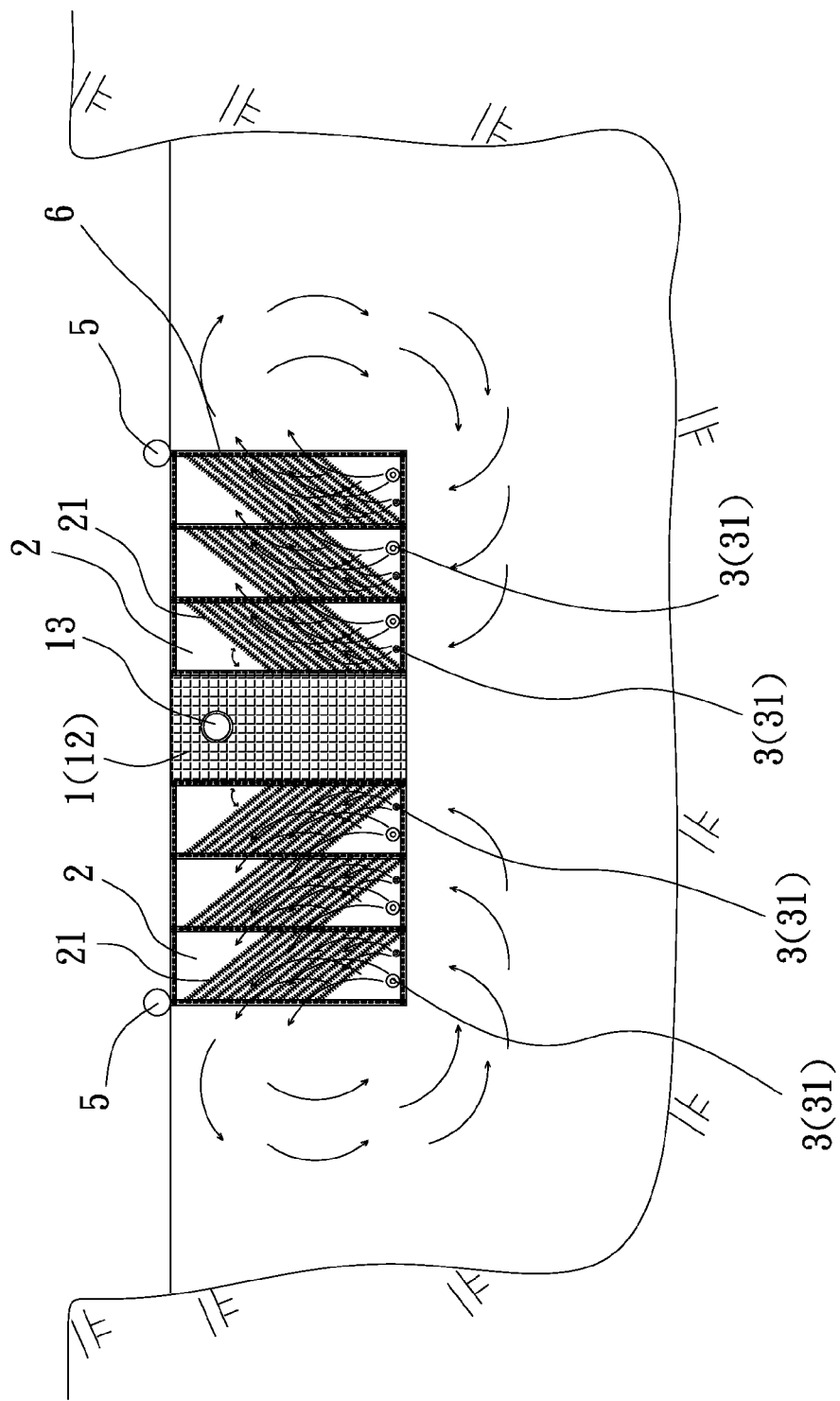
FIG. 3 is a rear view of the submerged biofiltration purifying apparatus of FIG. 2.

Please refer to FIGS. 1 and 3. A submerged biofiltration purifying apparatus according to a preferred embodiment of the present invention includes a settling zone 1, one or more filtering zones 2 separately coupled to two lateral sides of the settling zone 1, and one or more bubble aeration units 3 connected to a bottom of each of the filtering zones 2.

As can be seen from FIGS. 1 and 3, the settling zone 1 can be a three-dimensional (3D) rectangular space or other differently shaped 3D space with its top, bottom and two lateral sides in an open state, and its front and rear ends being provided with a front baffle 11 and a rear baffle 12, respectively. The rear baffle 12 is provided near an upper end thereof with a water outlet 13, to which a water pipe 14 is externally connected.

As can be seen from FIGS. 1 and 3, each of the filtering zones 2 defines a rectangular or other differently shaped 3D space with all sides thereof in a completely open state. Each of the filtering zones 2 is internally provided with a plurality of soft contact media 21. The soft contact media 21 are not restricted to any specific form, but are preferably arranged in and connected to each of the filtering zones 2 at a fixed oblique angle. In the illustrated preferred embodiment, the soft contact media 21 in each of the filtering zones 2 are connected at respective one end to a lower point on an inner side of the filtering zone 2 adjacent to or closer to the settling zone 1, and at respective opposing end to a higher point on an outer side of the filtering zone 2 farther away from the settling zone 1, such that the soft contact media 21 each have a slant bottom side facing toward two lateral sides of the overall submerged biofiltration purifying apparatus, as can be most clearly seen from FIG. 3.

As can be seen from FIGS. 1 and 3, the bubble aeration units 3 each include one or more bubble aeration pipes 31, which are connected to the bottom of the filtering zones 2. Each of the bubble aeration pipes 31 has an air inlet 32 and a bubble generating section 33. An air-supply pipe 4 is connected at an end to the air inlet 32 and at an opposing end to an external air pump (not shown). In the illustrated preferred embodiment, each of filtering zones 2 has one bubble aeration unit 3 provided thereto, and each of the bubble aeration units 3 includes two bubble aeration pipes 31 connected to the bottom of the filtering zone 2. One of the two bubble aeration pipes 31 is a large-bubble aeration pipe while the other is a small-bubble aeration pipe. The large-bubble aeration pipe is connected to the bottom of the filtering zone 2 closer to the outer side thereof, and the small-bubble aeration pipe is connected to the bottom of the filtering zone 2 closer to the inner side thereof. With this arrangement, the relatively fine air bubbles generated by the small-bubble aeration pipe can follow the moving direction of the relatively large air bubbles generated by the large-bubble aeration pipe to rise and move.

Again, as shown in FIGS. 1 and 3, in the submerged biofiltration purifying apparatus according to the preferred embodiment of the present invention, the settling zone 1 and the filtering zones 2 are assembled from a plurality of rigid bars 6, such as steel bars, to define the above-mentioned rectangular or other differently shaped 3D spaces. One or more buoys 5 can be connected to an uppermost end of the rigid bars 6. With the buoy or buoys 5, the whole submerged biofiltration purifying apparatus of the present invention can be used in a biological aerated lagoon to submerge below a water surface thereof.

Figure 2:
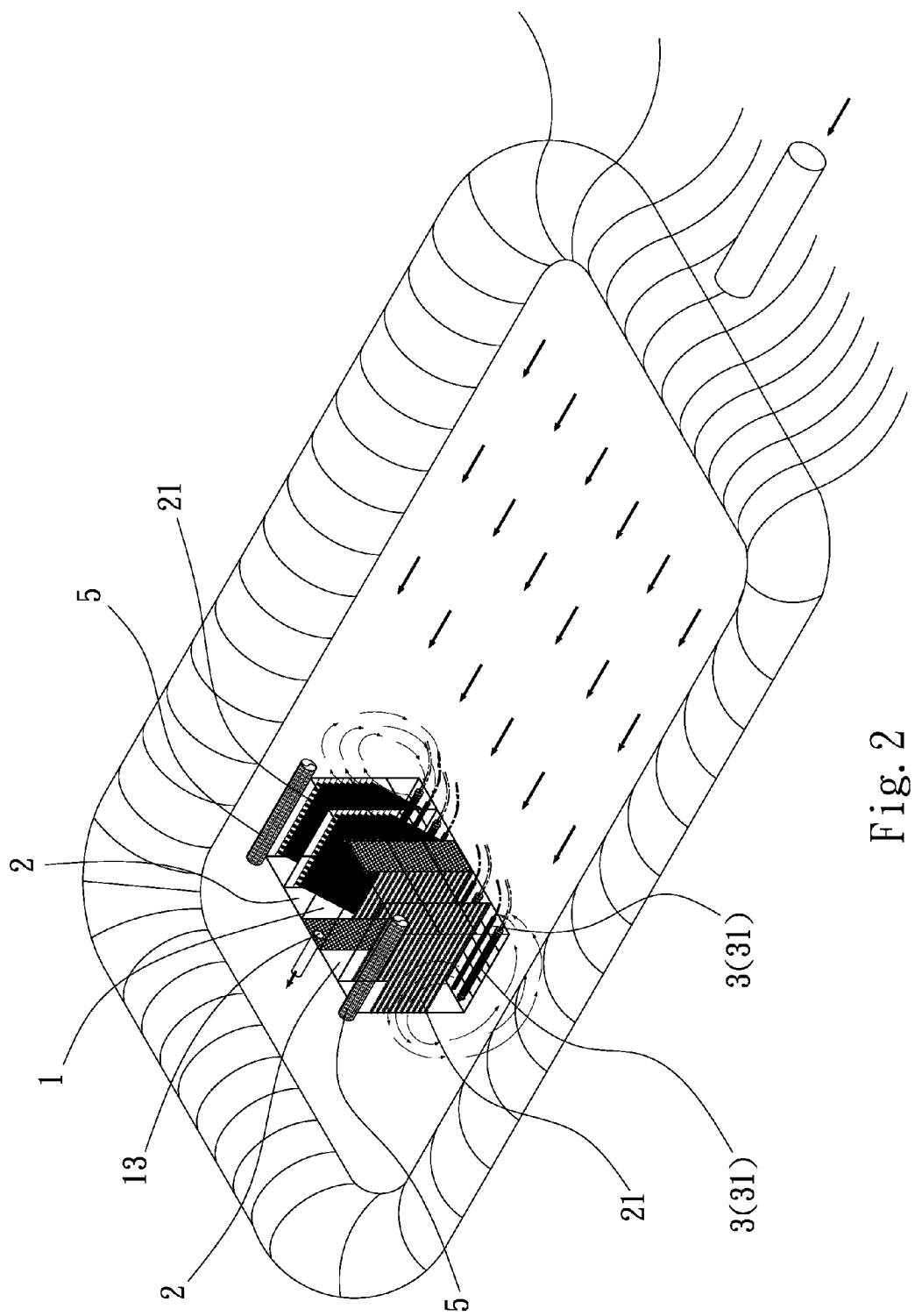
FIG. 2 is a perspective view showing an application of the submerged biofiltration purifying apparatus of FIG. 1 in sewage treatment.

Please refer to FIGS. 2 and 3. In practical application thereof, the submerged biofiltration purifying apparatus of the present invention can be flexibly used with the biological aerated lagoon. According to actual need, one or more of the submerged biofiltration purifying apparatus can be submerged below a water surface of sewage while the buoy or buoys 5 maintain the submerged biofiltration purifying apparatus in a floating state. Then, air is input via the air-supply pipe 4 to the bubble aeration units 3, that is, the bubble aeration pipes 31, for generating up-moving large and fine air bubbles, so that the air bubbles synchronously bring the sewage to move upward to the soft contact media 21. Therefore, through the aeration volume distribution achieved by the bubble aeration units 3, i.e. the bubble aeration pipes 31, and the particular design of the soft contact media 21, the present invention on the one hand enables biological films (microorganisms) to more stably grow on the soft contact media 21 and accordingly enhances the filtration of sewage to remove suspended solids and organic substances therefrom; and on the other hand generates naturally rising air bubbles via the bubble aeration units 3, or the bubble aeration pipes 31, without the need of any other additional power supply. The generated air bubbles guide the sewage to flow toward the soft contact media 21, so that the suspended solids and organic substances in the sewage are adsorbed to or removed by the biological films. Meanwhile, with the soft contact media 21 connected to the filtering zones 2 at a specific oblique angle, the rising air bubbles and sewage naturally diffuse toward the two lateral sides of the settling zone 1 and form a recycling effect, as indicated by the arrows. Thus, the pollutant adsorption, filtration, removal, and disturbance effects that can be obtained from the whole biological aerated lagoon are improved. Further, when the rising air bubbles contact with the soft contact media 21, increased oxygen transfer efficiency can be achieved. Meanwhile, through the disturbance and a shearing effect of the air bubbles and water flows, aged biological films are stripped off from the soft contact media 21 and settle, allowing new biological films to stably grow on the soft contact media 21. Therefore, the biological films can always maintain in an active state, and the problem of a clogged filter is solved. Further, purified water so obtained can be settled in the settling zone 1 again to remove any remaining suspended solids from the water. The purified water is then discharged via the water outlet 13 and the water pipe 14. The above process continues to complete the sewage purifying treatment.

Figure 4:
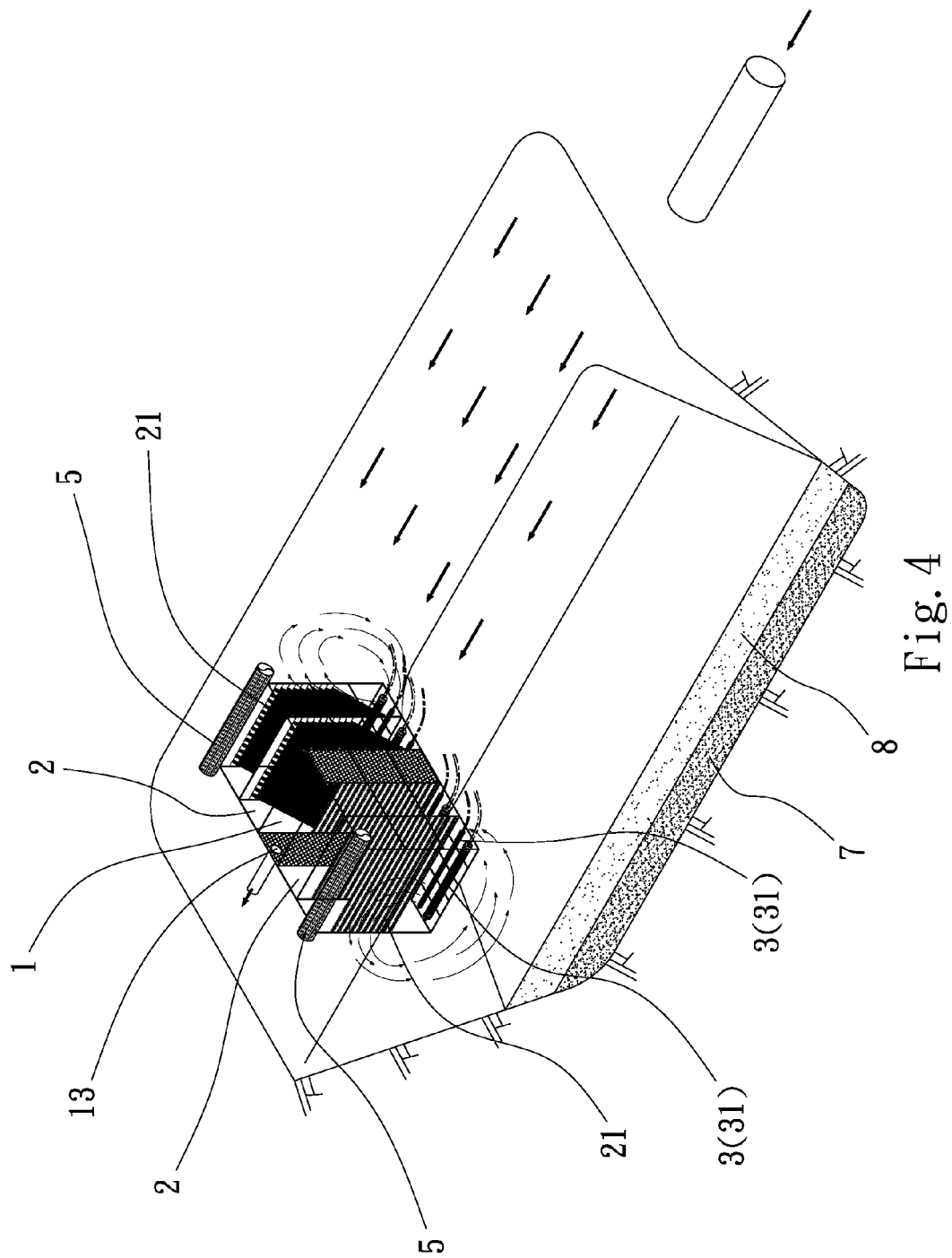
FIG. 4 is a sectioned perspective view of FIG. 2 showing a working environment of the submerged biofiltration purifying apparatus of the present invention.

Please refer to FIG. 4. In the present invention, a total contact area provided by the soft contact media 21 in the filtering zones 2 is large enough to grow sufficient biological films to adsorb or remove the pollutants and organic substances in the sewage. Meanwhile, activated sludge in the biological aerated lagoon can also play a role in adsorbing or removing the pollutants and organic substances in the sewage. Moreover, the biological films can effectively oxidize ammonia-nitrogen ($NH_4$—N) in the sewage to nitrate ($NO_3$) to thereby achieve the purpose of nitrification. Further, at the bottom of the biological aerated lagoon, there are an anaerobic zone 7 and an anoxic zone 8. In bioremediation, the anaerobic zone 7 and the anoxic zone 8 form the optimum condition for de-nitrification to convert nitrate ($NO_3$) into nitrogen ($N_2$).

In the structural design of the present invention, there are included a settling zone, a plurality of filtering zones, and a plurality of bubble aeration units, allowing the submerged biofiltration purifying apparatus to submerge below the sewage in the biological aerated lagoon to cooperate with the latter, so that sewage treatment can be performed in a simple way at reduced electric power consumption to provide stable filtering effect, upgraded pollutant removal efficiency, and high flexibility in operation. These facts make the present invention fully novel and improved. Further, the present invention is industrially practical for use because products derived from the present invention would no doubt fully satisfy the current market demands.

The present invention has been described with a preferred embodiment thereof and it is understood the described preferred embodiment is not intended to restrict the present invention and many changes and modifications in the described embodiment can be carried out without departing from the scope and the spirit of the invention that is intended to be limited only by the appended claims.

What is claimed is:

1. A submerged biofiltration purifying apparatus, comprising a settling zone being a 3D space with a top, a bottom, and two lateral sides thereof in an open state; one or more filtering zones being separately coupled to two lateral sides of the settling zone and each being a 3D space with all sides thereof in a completely open state, and each of the filtering zones having a plurality of soft contact media provided therein and connected thereto; and one or more bubble aeration units being connected to bottoms of the filtering zones.

2. The submerged biofiltration purifying apparatus as claimed in claim 1, wherein the soft contact media are respectively connected to the filtering zone at a fixed oblique angle.

3. The submerged biofiltration purifying apparatus as claimed in claim 2, wherein the soft contact media in each of the filtering zones are connected at respective one end to a lower point on an inner side of the filtering zone adjacent to or closer to the settling zone, and at respective opposing end to a higher point on an outer side of the filtering zone farther away from the settling zone, such that the soft contact media each have a slant bottom side facing toward two lateral sides of the submerged biofiltration purifying apparatus.

4. The submerged biofiltration purifying apparatus as claimed in claim 1, wherein the bubble aeration unit includes one or more bubble aeration pipes connected to the bottoms of the filtering zones.

5. The submerged biofiltration purifying apparatus as claimed in claim 1, wherein the bubble aeration unit includes two bubble aeration pipes connected to the bottoms of the filtering zones; one of the two bubble aeration pipes being a large-bubble aeration pipe while the other one being a small-bubble aeration pipe; the large-bubble aeration pipe being connected to the bottom of the filtering zone closer to an outer side thereof that is farther away from the settling zone, and the small-bubble aeration pipe being connected to the bottom of the filtering zone closer to an inner side thereof that is closer to the settling zone.

6. The submerged biofiltration purifying apparatus as claimed in claim 1, wherein the settling zone is provided on a front and a rear end thereof with a front baffle and a rear baffle, respectively, and the rear baffle being provided with a water outlet.

7. The submerged biofiltration purifying apparatus as claimed in claim 6, wherein the water outlet is connected to a water pipe.

8. The submerged biofiltration purifying apparatus as claimed in claim 1, wherein the settling zone and the filtering zone or zones each are a rectangular 3D space.

9. The submerged biofiltration purifying apparatus as claimed in claim 8, wherein the settling zone and the filtering zone or zones are assembled from rigid bars to define the rectangular 3D spaces.

10. The submerged biofiltration purifying apparatus as claimed in claim 9, further comprising one or more buoys connected to an uppermost end of the rigid bars.

* * * * *